Jan. 14, 1969  W. ASLAN  3,421,547

CHECK VALVE MECHANISM

Filed Nov. 30, 1965

INVENTOR.
WILFRED ASLAN

BY

ATTORNEYS

United States Patent Office 3,421,547
Patented Jan. 14, 1969

3,421,547
CHECK VALVE MECHANISM
Wilfred Aslan, Mahwah, N.J., assignor to Alkon Products Corporation, Hawthorne, N.J., a corporation of New York
Filed Nov. 30, 1965, Ser. No. 510,645
U.S. Cl. 137—539
Int. Cl. F16k 15/04; F16k 15/02
9 Claims

ABSTRACT OF THE DISCLOSURE

A check valve mechanism including an axially movable valve member and a valve retainer of open construction disposed within a passageway of a body member with the retainer having surfaces for controlling both the axial and radial movement of the valve member within the passageway.

---

The present invention relates to a check valve and more particularly to a check valve mechanism constructed to move axially within the fluid passageway of a flow control valve from closed to opened position and to prevent a minimum obstruction to the flow of fluid through such passageway when moved to opened position.

Flow control valves which include some provision for metering the flow of fluid through the valve are conventionally provided with a check valve mechanism within the valve housing for permitting the fluid flow to bypass the metering mechanism when passing through the valve in one direction and for preventing such bypassing when the flow is in the opposite direction. Also, check valve mechanisms are used separately in flow systems for controlling the direction of fluid flow. In providing metered flow control valves with a check valve mechanism or where the check valve is used alone in a fluid system, it is desirable to have the flow area through the check valve equal to or greater than the permissible flow area through the remaining portions of the fluid system. For example, a valve with 3/8″ pipe ports should have a flow area through the check valve at least equal to the 3/8″ diameter of the pipes which are connected to the valve. If the flow control check valve does not have enough flow capacity, it is usually necessary to use an oversized valve and then employ bushings to reduce the size of the valve pipe ports to match that of the fluid conducting pipes used elsewhere in the system.

It is apparent that the addition of a check valve mechanism directly into a fluid passageway tends to obstruct the flow of fluid when in opened position if the check valve is restricted to movement within the flow area of the passageway when shifted from its fully closed to its fully opened position. Valves have been constructed in which the check valve mechanism includes a ball movable from a fluid blocking position disposed in the fluid passageway to a retracted open position disposed out of the path of the fluid flow. Such constructions do provide for an unobstructed flow of fluid through the passageway when in fully opened position, however, they are cumbersome in design and typically require that the valve ports at the opposite ends of the valve be staggered. Such a construction has the disadvantage of not being readily connectable into the ordinary fluid system since the connecting pipes must also be staggered to match the misalignment of the valve ports.

In accordance with the teachings of the present invention, applicant has devised a check valve mechanism that is operable directly in the fluid flow passageway; and which when in open position, provides a flow area therethrough substantially equal to that of the remaining portions of the fluid passageway. Generally, the check valve of the present invention includes a ball member disposed in the fluid passageway of the valve for movement axially thereof, a valve seat extending transversely across the passageway and a ball urging against this valve seat to close the passageway when fluid flow is in one direction through the valve. When the pressure differential of the valve is reversed, the ball is moved axially of the passageway away from the valve seat and thus fluid is permitted to flow through the valve. For retaining the ball in operative position in the flow passageway of the valve and for urging it to closed position, a retainer cage is positioned in the pasageway on the side of the ball opposite the valve seat. This retainer holds a spring member engaging the ball and urging it toward the valve seat.

In accordance with the teachings of the present invention, the retainer itself is constructed with openings permitting the flow of fluid therethrough; and in addition, the fluid passageway is undercut in the area of the retainer and ball by an amount which substantially compensates for the restriction of the fluid flow as caused by the ball and retainer when the ball is moved to its fully opened position.

A more complete understanding of the present invention will be obtained from a reading of the following detailed description with reference being made to the accompanying drawings of which:

Figure 1:
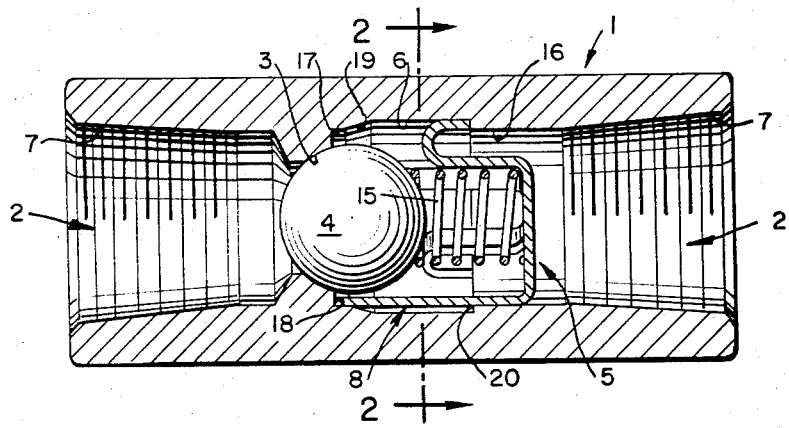
FIG. 1 is a cross-sectional view of the check valve mechanism of the present invention.
Figure 2:
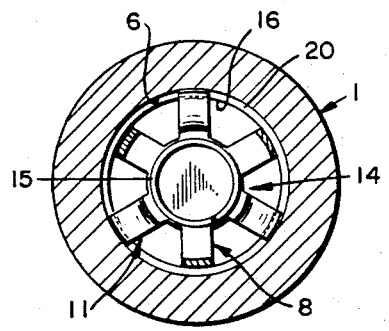
FIG. 2 is a cross-sectional view taken along lines 2—2 of FIG. 1.

As shown in FIG. 1, a check valve mechanism is generally comprised of the valve body member 1 having a fluid flow passageway 2 extending axially therethrough and a valve seat 3 extending transversely thereacross, a ball member 4 positioned in the passageway, and a ball retainer assembly 5 for holding the ball in operative position. The flow passageway is undercut as shown generally at 6 and the ends of the passageway are threaded as at 7 and 7′ for connection to mating pipes in a fluid flow system.

Figure 3:
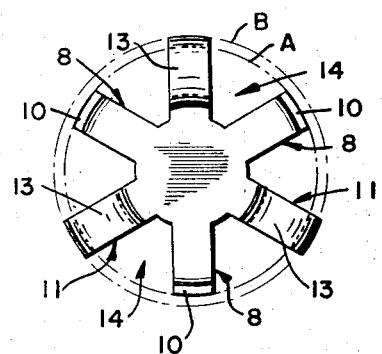
FIG. 3 is an end view of the retainer portion of the check valve mechanism.
Figure 4:
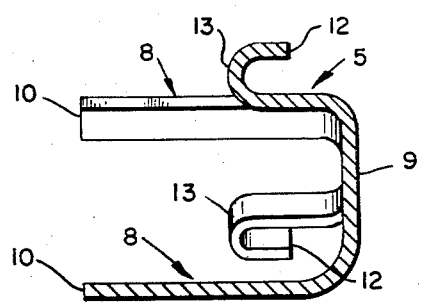
FIG. 4 is an enlarged side cross-sectional view of the retainer.

The retainer cage 5 for holding the ball member 4 in operative position within the flow passageway is stamped out of flexible sheet metal and formed into the shape shown in FIG. 4. As there shown, the retainer takes on a cup-shaped appearance and is comprised of a series of spokes. One set of these spokes designated 8 project transversely of the base 9 of the retainer and terminate at 10 to define the open end of the retainer. The outer diameter of the retainer as defined by these spokes defines a circle A shown in FIG. 3. A second set of spokes 11 are positioned intermediate the spokes 8. They also extend transversely of the base 9 of the retainer but unlike the spokes 8 are bent in a reverse fashion and terminate in ends 12 facing toward the base 9. The outer diameter of the retainer as defined by the ends of the spokes 11 define a second circle B spaced outwardly of the first circle A. The forward ends of these spokes 11 as they extend in a direction away from the base of the retainer are defined by the bent portions 13 and as shown in FIG. 3, these portions are spaced radially inwardly of the spokes 8. As will be apparent from the drawings, the retainer formed in this manner is of open construction with the openings therethrough being defined by the spaces 14 between the adjacent spokes.

This retainer is adapted to be inserted into the valve body member 1 through the threaded port 7 to retain the ball 4 in operative position within the flow passageway.

In assembling the valve, the ball is first inserted and then a spring element is positioned within the cup-shaped retainer and these two elements slid through the threaded port 7. For accommodating the retainer element, the flow passageway of the valve is provided with passageway portions 16 and 17 having a diameter substantially equal to or slightly smaller than the outer diameter of the retainer as defined by the spokes 8. Intermediate the portions 16 and 17 or the flow passageway, there is provided a circumferential groove which defines the undercut or recessed area 6 of the flow passageway. The diameter of this groove 6 is substantially equal to or slightly smaller than the diameter of the cup-shaped retainer as defined by the ends 12, spokes 11, which as shown in FIG. 3, define the circle B.

For limiting the extent to which the retainer element may be moved into the flow passageway, the valve seat 3 is spaced radially inwardly from the wall surface of the passageway and connected thereto by an annular flange 18 facing the retainer element. This flange is adapted to be engaged by the ends 10 of the spokes 8 when inserted into the position shown in FIG. 1. The intermediate portions of these spokes 8 will, in turn, span the recessed area 6; and for guiding the ends 10 into seated position on the passageway portion 17, the circumferential groove is tapered inwardly at 19. When the retainer is positioned within the valve body member, the spokes 8 operate to keep the center line of the ball retainer aligned with the center line of the passageway and also limit the radial travel of the ball as it is moved axially of the passageway. For this latter purpose, the inner diameter of the retainer as defined by the inner surfaces of the spokes 8 is constructed to be substantially equal to the diameter of the ball 4.

For holding the retainer in operative position against movement away from the valve seat 3, the circumferential groove 6 terminates at a point spaced axially from the ball 4 on the side thereof opposite the valve seat 3 in an annular flange 20 facing the valve seat. On installation of the retainer, the spokes 11 due to their spring-like nature will be squeezed down through the valve portion 16 until they are disposed within the area of the recess 6. Then they will spring back into their original size and the ends 12 of these spokes will engage the annular flange 20 thereby locking the retainer in operative position.

These spokes 11 in addition to providing a locking for the retainer also provide a stop for limiting the axial movement of the ball 4 away from the valve seat 3. As already described, the spokes 11 are provided with the bent over surfaces 13 spaced radially inwardly of the spokes 8. These surfaces 13 are axially aligned with the ball 4 and as the ball moves away from the valve seat, it will engage against these surfaces 13. The extent to which the spokes 11 extend toward the valve seat 3 is such as to permit a full opening of the valve. In addition, the extent to which the valve passageway is recessed at 6 is correlated relative to the surface area of the retainer disposed within the flow passageway. In particular, the recessed area 6 is of a diameter sufficient to substantially compensate for the restriction of the fluid flow through the passageway as caused by the presence of the ball and retainer within such passageway when the ball is moved to its opened position engaging the surfaces 13 of the spokes 11.

From the above, it will be seen that applicant has provided a check valve mechanism which is particularly suitable for positioning in a flow passageway between axially aligned valve ports and one which substantially compensates for the restriction in flow area as caused by the retainer and ball. With this construction, the valve may be incorporated directly into a flow system having in-line ports with the flow area through the check valve when in open position being substantially equal to that through the remaining portions of the system.

The description of the present invention as given above is of the preferred embodiment thereof; however, it is to be understod that various changes may be made without departing from the scope of the invention as set forth in the following claims.

I claim:

1. A check valve for controlling the flow of fluid comprising:
   (a) a body member having a passageway therethrough;
   (b) a valve seat disposed in said passageway and extending transversely across said passageway to define a valve orifice;
   (c) a valve member disposed within said passageway on one side of said valve seat for movement along said passageway from a first position seated against said valve seat to close said orifice to a second position axially spaced from said valve seat to open said orifice;
   (d) a valve retainer disposed within said passageway on the side of the valve member opposite said valve seat and having openings therethrough to accommodate fluid flow through said passageway, said retainer comprising a spoked member of general cup-shaped contour with the open end facing said valve member and having:
      (1) a first set of spokes extending axially of said passageway toward said valve seat radially outwardly of said valve member for retaining said valve member against radial movement in said passageway and terminating in abutment with an axially aligned surface of said passageway facing away from said valve seat for limiting movement thereof toward said valve seat, and
      (2) a second set of spokes having a first portion extending axially of said passageway toward said valve seat in axial alignment with said valve member to a point spaced axially therefrom and a second portion extending into abutment with an axially aligned surface of said passageway facing said valve seat; and
   (e) resilient means for urging said valve member against said valve seat.

2. A check valve according to claim 1 wherein:
   (a) said valve member is spherical in shape.

3. A check valve according to claim 2 wherein:
   (a) alternate spokes of said retainer define one of said sets; and
   (b) the openings through said retainer are defined by spacing between each adjacent spoke.

4. A check valve for controlling the flow of fluid comprising:
   (a) a body member having a passageway extending therethrough;
   (b) a valve seat disposed in said passageway and extending transversely across said passageway to define a valve orifice, said valve seat being spaced radially inwardly of the wall of said passageway and connected thereto by a first annular flange facing axially of said passageway on one side of said valve seat;
   (c) a valve member disposed within said passageway on the one side of said valve seat for movement along said passageway from a first position seated against said valve seat to close said orifice to a second position axially spaced from said valve seat to open said orifice;
   (d) a circumferentially extending groove in said passageway terminating at a point spaced axially from said valve member on the side thereof opposite said valve seat in a second annular flange facing said valve seat;
   (e) a valve retainer disposed within said passageway on the side of the valve member opposite said valve seat and having openings therethrough to accommodate fluid flow through said passageway, said retainer comprising a spoked member having a general cup-shaped contour with the open end facing said valve member and having:

(1) a first set of spokes extending axially of said passageway radially outwardly of said valve member for retaining said valve member against radial movement and with the ends of said first set of spokes aligned with said first annular flange to limit movement thereof toward said valve seat, and (2) a second set of spokes extending axially of said passageway toward said valve seat in axial alignment with said valve member and to a point spaced from said valve member when the latter is in said first position to provide a stop limiting the axial movement of said valve member away from said valve seat and beyond said second position, said second set of spokes being bent radially outwardly of the axis of said passageway and terminating in ends facing away from said valve seat and in engagement with said second annular flange; and (f) resilient means for urging said valve member against said valve seat.

5. A check valve according to claim 4 wherein:
(a) the second set of spokes of said retainer are comprised of flexible material.

6. A check valve according to claim 5 wherein:
(a) the diameters of said passageway on axially opposite sides of said circumferentially extending groove are substantially equal to each other and to the outer diameter of the cup-shaped retainer as defined by said first set of spokes.

7. A check valve according to claim 6 wherein:
(a) the inner diameter of said cup-shaped retainer as defined by said first set of spokes is substantially equal to the diameter of said valve member.

8. A check valve according to claim 7 wherein:
(a) the circumferentially extending groove of said passageway terminates on the side thereof adjacent said valve seat in a radially inwardly tapered portion.

9. A check valve according to claim 8 wherein:
(a) said resilient means for urging said valve member toward said valve seat is a compression spring disposed within said cup-shaped retainer and having one end engaging said valve member and the other end engaging the bottom of said retainer.

References Cited

UNITED STATES PATENTS

| 1,668,891 | 5/1928 | Dudley | 137—533.19 |
| 1,989,199 | 1/1935 | Hummert | 137—533.13 |
| 3,002,528 | 10/1961 | Leissner | 137—543.19 X |
| 3,260,279 | 7/1966 | Leibmann | 137—533.19 X |

FOREIGN PATENTS 230,954  7/1959  Australia.

WILLIAM F. O'DEA, Primary Examiner.

DENNIS H. LAMBERT, Assistant Examiner.

U.S. Cl. X.R.

137—543.19